May 3, 1966  R. X. MEYER ETAL  3,249,869
APPARATUS FOR MEASURING THE ELECTRICAL PROPERTIES
OF A CONDUCTIVE MOVING FLUID
Filed Jan. 3, 1961  2 Sheets-Sheet 1
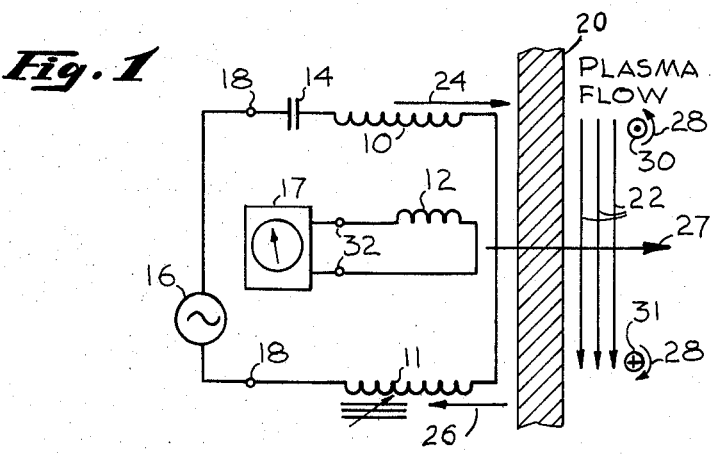
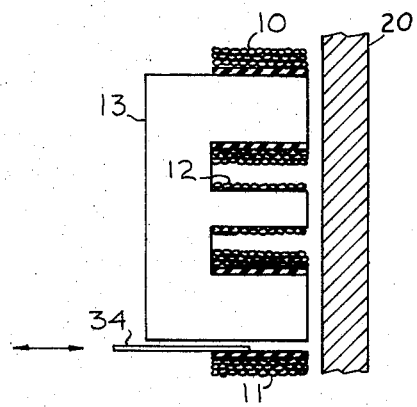
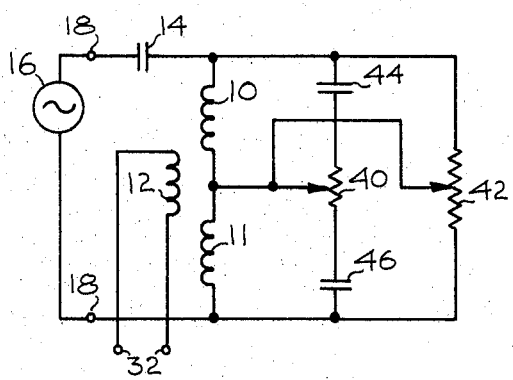
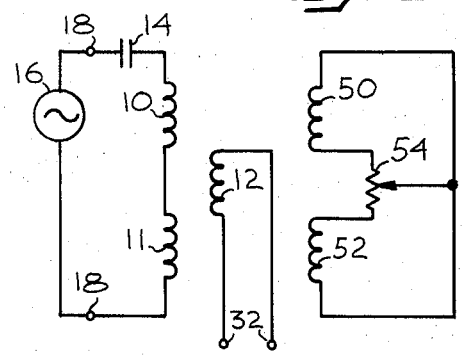
RUDOLF X. MEYER
ALLEN E. FUHS
ALLAN B. SCHAFFER
INVENTORS
BY Fraser and Bogucki
David P. Ogden
ATTORNEYS

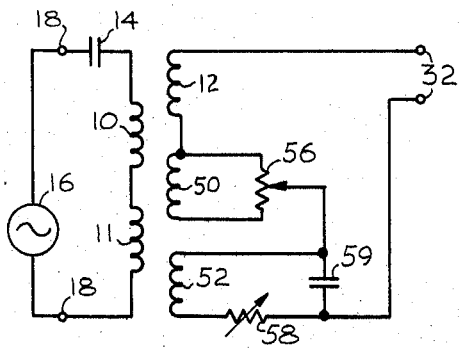
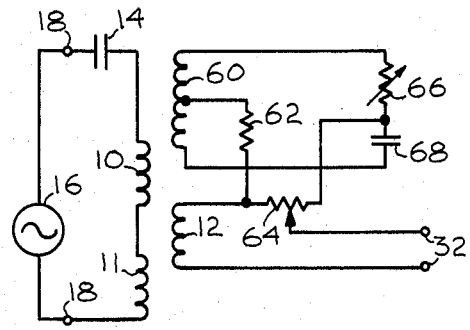
Fig. 5  Fig. 6
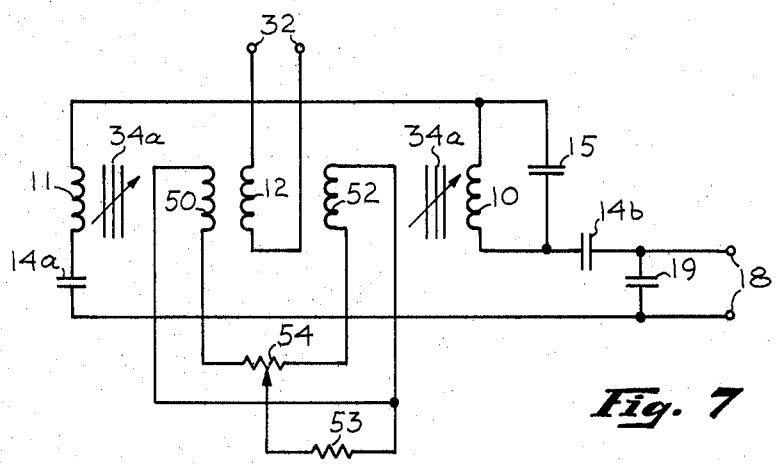
Fig. 7
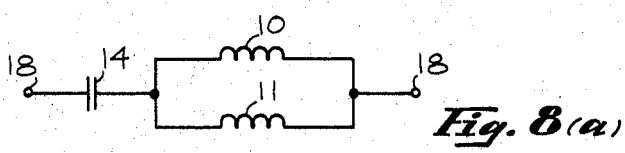
Fig. 8(a)
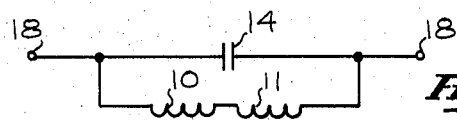
Fig. 8(b)
Fig. 8(c)
RUDOLF X. MEYER
ALLEN E. FUHS
ALLAN B. SCHAFFER
INVENTORS
BY
ATTORNEYS

United States Patent Office 3,249,869
Patented May 3, 1966

3,249,869
APPARATUS FOR MEASURING THE ELECTRICAL PROPERTIES OF A CONDUCTIVE MOVING FLUID
Rudolf X. Meyer, Pacific Palisades, and Allen E. Fuhs and Allan B. Schaffer, Palos Verdes Estates, Calif., assignors, by mesne assignments, to TRW Inc., a corporation of Ohio
Filed Jan. 3, 1961, Ser. No. 80,116
6 Claims. (Cl. 324—40)

This invention relates to apparatus for measuring the degree of ionization in a fluid medium and more particularly to a device for measuring the electrical conductivity of a moving plasma.

When gaseous material is raised to a relatively high temperature, or when the particles of gas are accelerated to a relatively high velocity, a large number of gas molecules may become ionized. As is well known, an ionized gas, sometimes referred to as a plasma, is capable of carrying an electrical current in accordance with the degree to which the gas is ionized. Accordingly, a measure of the ionization of a gas is its electrical conductivity.

Although the ionization of gases may occur in many well known ways, particular problems have arisen in the field of magnetohydrodynamics, as well as in the generation of a plasma sheath about high velocity vehicles passing through the atmosphere, which require an accurate determination of the precise degree to which the gas has been ionized. For example, the appearance of a highly ionized plasma may block the passage of radio frequency waves so that communication with a space vehicle may be interrupted as the vehicle re-enters the earth's atmosphere. Accordingly, it is important for a number of different purposes to provide a device capable of accurately measuring the electrical conductivity of a moving gaseous medium.

It is therefore a general object of this invention to provide an improved device for measuring the ionization of a moving plasma.

More specifically, it is an object of this invention to obtain the measurement of the ionization of a moving plasma with an increased degree of accuracy over those devices known in the art.

A further object of this invention is to provide for the measurement of the electrical properties of a moving plasma by means of apparatus which need not be exposed to the plasma itself.

Briefly, an arrangement of the invention may include three inductive coils having a particular configuration with respect to each other. Two of the coils are arranged to carry current so as to develop magnetic fields which in the absence of plasma flow cancel each other at the location of the third coil. The coils are advantageously mounted in accordance with the invention on the opposite side of a wall or shield from the location of the plasma which is to be measured. Thus, for example in the case of a missile or other re-entrant vehicle, the apparatus of the invention may be mounted within the nose cone of the missile so that it is fully protected from erosion as the missile passes through the atmosphere at extreme speeds.

In the apparatus of the invention, the two magnetic field producing coils are connected in circuit with a source of alternating current so as to develop a time-varying magnetic field in the region of the coils. This field extends to the area in which the plasma is located but, as mentioned above, is substantially nonexistent in the vicinity of the third coil (which may be known as a search or sensing coil) because of the mutual cancellation of magnetic field at that point. When there is relative motion between the apparatus of the invention and the plasma, however, a different situation exists. Because the plasma is now moving through a region of the magnetic field a voltage is induced in the plasma and a resultant current flows which is dependent upon the conductivity of the plasma. This current develops a magnetic field of its own which is sensed by the search winding and which generates a corresponding voltage therein. The voltage varies in accordance with the magnitude of the current which is induced in the plasma and therefore is utilized in accordance with the invention as a measure of the conductivity of the plasma itself.

While the above is a description of an illustrative arrangement in accordance with the invention, it has been discoverd that enhanced operation of the apparatus may be afforded by providing additional refinements which serve to compensate for unwanted secondary effects experienced in the operation of the illustrative arrangement. Thus, it has been found desirable to include variable tuning means in order to provide a more precise balance between the two magnetic field producing coils so that the background magnetic field at the sensing coil can be reduced to a minimum. Furthermore, in accordance with an additional aspect of the invention, compensating arrangements may be provided to eliminate the unwanted effects resulting from the occurrence of eddy currents in portions of the enclosing structure in the vicinity of the apparatus of the invention.

A better understanding of the invention may be had from a consideration of the following detailed description taken in conjunction with the drawings, in which:

FIG. 1 is a schematic representation of an embodiment of the invention;

FIG. 2 depicts the structure of a portion of the invention and shows a particular coil balancing arrangement;

FIG. 3 is a schematic representation of a second coil balancing circuit;

FIG. 4 is a schematic representation of one arrangement for eliminating the unwanted effects of eddy currents in the structure;

FIGS. 5 and 6 are schematic representations of compensating circuits which both balance the primary coils and cancel the eddy current effects;

FIG. 7 is a schematic representation of one embodiment of the invention; and

FIGS. 8a, 8b and 8c depict in schematic form a number of different circuit arrangements for connecting the magnetic field producing coils of the apparatus of the invention.

In FIG. 1, which is a schematic representation of an arrangement in accordance with the invention, a pair of coils 10 and 11 are shown in series circuit connection with a capacitor 14, terminals 18 and a source 16 of alternating voltage. The coils 10 and 11 are so arranged that the magnetic fields developed thereby are opposite in direction. Thus at a particular instant in time the fields may be represented by the arrows 24 and 26 respectively. It will be understod in the discussion which follows however that the fields actually vary as a function of time in accordance with the alternating voltage which is applied thereto from the source 16. In the absence of distortion of the resultant magnetic field a point exists between the coils 10 and 11 at which the magnetic field is zero. At this point coil 12 is located having terminals 32 to which an indicating device or indicator 17 is connected.

A particular arangement of the coils 10, 11 and 12 of the circuit of FIG. 1 is illustrated in FIG. 2. It can be seen that the coils 10, 11 and 12, which are wound on respective legs of a laminated ferromagnetic core 13, are positioned adjacent a wall 20 which in operation separates the apparatus from the region containing the plasma. In practice it is desirable to provide some adjustment to compensate for slight variations in the coils 10 and 11. In FIG. 2 this is accomplished by means of a movable or adjustable slug 34 which is employed to vary the inductance of the coil 11 until it matches the inductance of the coil 10. Although not shown here, a similar slug may be employed in conjunction with the coil 10 also.

In the operation of the invention, the coils 10, 11 and 12 are fixed in position adjacent the wall 20 with current from the source 16 flowing through the coils 10 and 11. The device is carefully balanced in the absence of plasma flow by means of the adjustable slug 34. When a null point is recorded on the indicator 17, which may be set to indicate zero at the null, the device is balanced and ready for use.

With the flow of plasma as indicated by the arrows 22 in the region on the opposite side of the wall 20 a distortion of the magnetic field is produced which causes a signal to be developed in the coil 12 thus producing an indication on the indicator 17. This effect will be described as related to an instantaneous magnetic field having the direction shown by the arrows 24 and 26. The flow of plasma through this field which permeates the region in which the plasma exists produces a generator effect; that is, an electric field is induced which may be represented by the factor $u \times B$, where $u$ and $B$ are vectors and $x$ represents the cross product of the two vectors, $u$ represents the velocity of the plasma particles and $B$ represents the magnetic flux density. This electric field $u \times B$ in turn produces a current density which is equal to $\sigma u \times B$ where $\sigma$ represents the conductivity of the plasma.

In FIG. 1 the induced current is schematically represented by the circles 30 and 31, the circle 30 containing a dot indicating the flow of current out of the plane of the drawing while the circle 31 contains a cross representing the flow of current into the plane of the drawing. This current in turn produces its own magnetic field which is represented by the arrows 28 encircling the circles 30 and 31 and which results in a composite field that may be represented by the arrow 27. The field represented by the arrow 27 links the coil 12 and, because it is a time variant field bearing a given phase relationship to the alternating voltage of the source 16, it induces a voltage in the coil 12. This is applied to the indicator 17 via the terminals 32 where it provides a meter reading indicative of the induced voltage. Since this voltage is proportional to the current density represented by the term $\sigma u \times B$, the indicator 17 can be employed to provide an indication of the conductivity $\sigma$ of the plasma by eliminating the factors $u$ and $B$ from the expression. The flux density $B$ is known, since it is controlled by the current in the coils 10 and 11. Other sensing devices (not shown) are employed to measure the velocity $u$ of the plasma. Thus, by means of this arrangement of the invention, a measurement of the conductivity of the plasma flowing adjacent the wall 20 is obtained having substantially greater accuracy than has been heretofore possible with any previously known device available for such a purpose. Accordingly, the invention provides a simple, reliable, compact arrangement for measuring the conductivity of a fluid, or plasma, which is moving relative to the measuring apparatus.

It has been pointed out that the voltage induced in the sensing coil 12, which is employed to energize the indicator 17, is proportional to the term $\sigma u \times B$. In the practice of the invention described herein, the relative velocity $u$ and the magnetic flux density $B$ are known so that the indicator 17 may provide a measurement of the conductivity $\sigma$ (corresponding to the degree of ionization) of the plasma. It will be understood that the apparatus of the invention may just as well be used to provide a measurement of relative velocity between the apparatus and a gaseous medium, should the conductivity $\sigma$ thereof be known in advance. Similarly the magnetic flux density $B$ may be measured if both conductivity and relative velocity are known quantities.

An appreciation of the extreme sensitivity of the apparatus of the invention may be gained from the fact that the magnetic field to be deteced is of the same order of magnitude as the earth's magnetic field. The two fields are distinguished by virtue of the fact that the instrument responds to a time variant field which is produced by the A.-C. source 16. In order to maximize the strength of the magnetic field developed by available equipment the coils 10 and 11 are turned by means of the capacitor 14 so that a series resonant circuit results. Thus the maximum current is caused to flow thorugh the coils 10 and 11 so that the corresponding field may be as large as possible.

One way of balancing the coils 10 and 11 by means of the adjustable slug 34 in order that the null in the signal induced in the coil 12 may be truly zero has already been discussed in connection with FIG. 2. Another arrangement for accomplishing a similar result is represented in FIG. 3 which shows the midpoint between the coils 10 and 11 connected to a pair of potentiometers 40 and 42 in circuit with capacitors 44 and 46 so that the individual magnetic fields of the coils 10 and 11 may be equalized in order that the fields cancel each other out at the location of the coil 12.

Even though the effects of variations in the respective coils 10 and 11 of FIG. 2 may be tuned out by means of the adjustable slug 34 or the potentiometer arrangement shown in FIG. 3, it has been found that a residual component of voltage is usually picked up by the sensing coil 12 during the balancing of the device. This residual signal is caused by asymmetric eddy currents induced by the coils 10 and 11 in the wall 20 if the wall is electrically conducting itself. These eddy currents exhibit a phase relative to the current from the source 16 in the primary loop which is dependent upon the ratio of resistance to self-induction in the eddy current loop. The effect of the eddy currents can be canceled out by a special signal which is adjustable in magnitude and phase relative to the current in the primary loop or the effect can be made to vanish by introducing two controlled currents which are similar to the eddy currents.

FIGS. 4, 5 and 6 illustrate schematically a number of different arrangements for canceling out the effects of the induced eddy currents. In FIG. 4 an arrangement is shown comprising two extra coils 50 and 52 connected in a series circuit with a potentiometer 54. The coils 50 and 52 are positioned as extra windings over the coils 10 and 11 on the core 13 of FIG. 2. In the arrangement of FIG. 4 the adjustment of the potentiometer 54 during the balancing of the device in the absence of plasma flow eliminates the residual signal normally resulting from the induced eddy currents. An advantage of this arrangement is that the sensing coil is not required to be in circuit with any other components, thus minimizing the effects due to stray capacitance and unwanted magnetic coupling. However, the arrangements of FIGS. 5 and 6 exhibit the advantages of low power dissipation and operation at low voltage. In FIG. 5 the extra pair of coils 50 and 52 is employed but these coils are connected in circuit with sensing coil 12 together with a potentiometer 56, a rheostat 58 and a capacitor 59. The adjustment of the potentiometer 56 and rheostat 58 during the balancing of the apparatus serves to adjust the phase and magnitude of the compensating signal until the residual induced voltage is substantailly zero, thus compensating for the effects of eddy currents and for variations in the primary coils as well.

FIG. 6 depicts a substantially similar arrangement except that the compensating coil 60 is in this case a single coil having a center tap so that a simpler configuration is possible. The circuit of FIG. 6 comprising the resistor 62, potentiometer 64, rheostat 66 and the capacitor 68 otherwise functions substantially the same as the circuit of FIG. 5 in compensating for the effects of the induced eddy currents and primary coil variations.

FIG. 7 is a schematic representation of one particular arrangement of the apparatus of the invention for providing measurements of the conductivity of a moving plasma. The circuit of FIG. 7 is similar to that of FIG. 4 with the exception that the series capacitor 14 comprises two capacitors 14a and 14b and additional capacitors 15 and 19 are added to enhance the operation of the circuit. Also an additional resistor 53 is shown in the eddy current compensating network in series with the coils 50 and 52. The adjustable magnetic slugs are represented by the symbols 34a. In the circuit of FIG. 7 the following component values and dimensions were employed and are given by way of example only of one workable embodiment:

| | |
|---|---|
| Coils 10 and 11 | 1275 turns, No. 25 AWG wire. |
| Coils 50 and 52 | 20 turns, No. 24 AWG wire. |
| Coil 12 | 1800 turns, No. 36 AWG wire. |
| Potentiometer 54 | 50 ohms. |
| Resistor 53 | 15 ohms. |
| Capacitor 14a | .480 $\mu$f. |
| Capacitor 14b | .482 $\mu$f. |
| Capacitor 15 | 200 $\mu\mu$f. |
| Capacitor 19 | .005 $\mu$f. |

With the above circuit component values the circuit of FIG. 7 may be energized at a frequency of 400 cycles per second.

FIGS. 8a, 8b, and 8c depict a number of alternative arrangements of the coils 10 and 11 which may be employed in the circuit of the invention in place of the capacitor 14 and the coils 10 and 11 of FIG. 1. In the circuits of FIGS. 8a and 8c coils 10 and 11 are shown in parallel. The difference between the two arrangements is that the circuit of FIG. 8a has a series capacitor while the circuit of FIG. 8c has a shunt capacitor connected to the coils 10 and 11. The arrangement of FIG. 8b shows the coils 10 and 11 in series with a capacitor 14 connected across both of the coils. An advantage is afforded by the use of the series arrangement of FIG. 1 or of FIG. 8b in that the same current flows through both of the coils 10 and 11 so that a more effective balancing of the apparatus can be effected.

Although there have been described above various specific arrangements of an ionization measuring device in accordance with the invention for the purpose of illustrating the manner in which the invention may be used to advantage, it will be appreciated that the invention is not limited thereto. Accordingly any and all modifications, variations or equivalent arrangements falling within the scope of the annexed claims should be considered to be a part of the invention.

We claim:

1. Apparatus for measuring the electrical conductivity of an ionized, moving plasma flowing adjacent to an electrically conductive wall when the velocity thereof is known comprising means for generating a time variant magnetic field extending into a plasma region, sensing means located in a position where the magnetic field strength is a minimum in the absence of the moving plasma and responsive to a distortion of the magnetic field by the moving plasma resulting from an induced current density $\sigma u x B$ within the plasma in response to an induced electric field $u x B$ where B is the magnetic flux density, $u$ is the plasma velocity, and $\sigma$ is the electrical conductivity of the plasma, and coil means linking said time variant magnetic field for reducing said minimum magnetic field strength substantially to zero by compensating for variations in the field generating means and for the unwanted effects of induced eddy currents in said electrically conductive wall.

2. Ionization detecting apparatus comprising a sensing coil positioned adjacent to one side of an eletcrically conducting wall adjacent to the other side of which flows a plasma medium, first and second magnetic field producing coils positioned on opposite sides of the sensing coil and arranged to produce a magnetic field in the plasma medium but a substantialy zero magnetic field in the vicinity of the sensing coil when the plasma is substantially stationary, an alternating current source for energizing the first and second coils with a time variant current, means connected to the sensing coil for indicating the voltage induced therein which is caused by the flow of current within the plasma medium resulting from the movement of plasma through the established magnetic field, and additional coil means linking the magnetic field produced by said first and second coils for counteracting the effects of eddy currents induced in said electrically conducting wall by magnetic fields from said first and second coils.

3. The invention according to claim 2, wherein said additional coil means comprises a pair of coils connected in series through a potentiometer.

4. The invention according to claim 2, wherein said additional coil means is connected in circuit with said sensing coil.

5. The invention according to claim 4, and further including a potentiometer connected in circuit with said sensing coil and said additional coil means.

6. Apparatus for measuring the electrical properties of a conductive plasma moving adjacent to an electrically conductive wall, said apparatus comprising:
   first and second magnetic field producing coils;
   a source of voltage for energizing said coils with a time varying current;
   a sensing coil positioned between said first and second coils in a region of minimum magnetic field produced by said first and second coils;
   said first and second coils and said sensing coil being positioned on the side of said wall remote from said plasma, with their coil axes displaced from one another, and with the axial component of the magnetic field produced by said first and second coils transverse to the direction of plasma flow;
   indicating means connected to said sensing coil for measuring the voltage induced therein when the plasma moves through the established magnetic field, and
   additional coil means linking the magnetic field produced by said first and second coils for reducing said minimum magnetic field substantially to zero by compensating for unwanted effects of induced eddy currents in said electrically conductive wall.

References Cited by the Examiner

UNITED STATES PATENTS

| | | | |
|---|---|---|---|
| 380,945 | 4/1888 | Shallenberger | 336—136 |
| 2,435,043 | 1/1948 | Lehde et al. | 324—40 X |
| 2,757,538 | 8/1956 | Soffel | 73—194 |
| 2,921,298 | 1/1960 | Jackson | 324—34 X |
| 2,929,247 | 3/1960 | Sturgeon | 73—194 |

FOREIGN PATENTS 1,157,500   5/1958   France.

OTHER REFERENCES

Sakuntala et al.: "J. Applied Physics," vol. 30, November 1959; pages 1669–1671.

Vigness et al.: "J. Applied Physics," vol. 13, June 1942; pages 377–383.

WALTER L. CARLSON, *Primary Examiner.*

SAMUEL BERNSTEIN, *Examiner.*

A. E. SMITH, F. A. SEEMAR, R. J. CORCORAN,
*Assistant Examiners.*